United States Patent [19]
Gupta et al.

[11] Patent Number: 5,787,272
[45] Date of Patent: Jul. 28, 1998

[54] METHOD AND APPARATUS FOR IMPROVING SYNCHRONIZATION TIME IN A PARALLEL PROCESSING SYSTEM

[75] Inventors: Rajiv Gupta, Ossining; Michael Abraham Epstein, Spring Valley, both of N.Y.

[73] Assignee: Philips Electronics North America Corporation, New York, N.Y.

[21] Appl. No.: 871,562

[22] Filed: Jun. 10, 1997

Related U.S. Application Data

[60] Continuation of Ser. No. 488,311, Jun. 7, 1995, abandoned, which is a division of Ser. No. 189,269, Jan. 31, 1994, abandoned, which is a continuation of Ser. No. 689,383, Apr. 22, 1991, abandoned, which is a division of Ser. No. 227,276, Aug. 2, 1988, abandoned.

[51] Int. Cl.⁶ .................................................. G06F 15/16
[52] U.S. Cl. ..................... 395/553; 395/560; 395/200.78
[58] Field of Search ................................. 395/553, 560, 395/200.78

[56] References Cited

U.S. PATENT DOCUMENTS

| | | | |
|---|---|---|---|
| 5,151,991 | 9/1992 | Iwasawa et al. | 395/706 |
| 5,222,229 | 6/1993 | Fukuda et al. | 395/553 |
| 5,317,734 | 5/1994 | Gupta | 395/706 |
| 5,434,995 | 7/1995 | Oberlin et al. | 395/553 |

*Primary Examiner*—Kenneth S. Kim
*Attorney, Agent, or Firm*—Anne E. Barschall

[57] ABSTRACT

A barrier is used to synchronize parallel processors. The barrier is "fuzzy", i.e. it includes several instructions in each instruction stream. None of the processors performing related tasks can execute an instruction after its respective fuzzy barrier until the others have finished the instruction immediately preceding their respective fuzzy barriers. Processors therefore spend less time waiting for each other. A state machine is used to keep track of synchronization states during the synchronization process.

11 Claims, 6 Drawing Sheets

1

METHOD AND APPARATUS FOR IMPROVING SYNCHRONIZATION TIME IN A PARALLEL PROCESSING SYSTEM

This is a continuation of prior application Ser. No. 08/488,311, filed on Jun. 7, 1995, now abandoned, which is a divisional application of application Ser. No. 08/189,269, filed on Jan. 31, 994, now abandoned, which is a continuation of application Ser. No. 07/689,383, filed Apr. 22, 1991, now abandoned, which is a divisional of application Ser. No. 07/227,276, filed Aug. 2, 1998, now abandoned.

BACKGROUND OF THE INVENTION

1. Field of the Invention

The invention relates to synchronizing parallel processors. In particular the invention relates to the use of barriers for such synchronization.

2. Prior Art

Known parallel processing systems execute computer code which has been converted into parallel instruction streams. Dividing computer code into parallel instruction streams has been described, for instance, in M. Wolfe et al. "Data Dependence and Its Application to Parallel Processing", International Journal of Parallel Programming, Vol. 16, No. 2 April 1987 pp. 137–178, and H. Stone, *High Performance Computer Architecture*, (Addison Wesley 1987) pp. 321, and 336–338. Some of the streams have lexically forward dependences and/or loop carried dependences. The concept of lexically forward dependences is described in R. Cytron, "Doacross: Beyond Vectorization for Multiprocessors", 1986 IEEE International Conference on Parallel Processing, pp. 836–844, especially at page 838. Loop carried dependences are described in M. Wolfe et al. The lexically forward and loop carried dependences lead to a requirement for synchronization between the instruction streams.

Using "barriers" allows for such synchronization. Barriers are points in the respective parallel instruction streams where the respective parallel processors have to wait to synchronize with each other. The use of barriers for synchronization is described in P. Tang et al., "Processor Self-Scheduling for Multiple-Nested Parallel Loops", Proc. 1986 Int. Conf. Parallel Processing, Aug. 1986, pp. 528–535.

A detailed description of a parallel processing system which uses such stopping points for synchronization can be found in U.S Pat. Nos. 4,344,134; 4,365,292; and 4,412,303 all issued to Barnes, or Barnes et al.

In the known parallel processing systems, the individual processors must spend time waiting for each other while they are attempting to synchronize. This makes the systems inefficient.

SUMMARY OF THE INVENTION

It is an object of the present invention to make parallel processing systems more efficient by reducing the amount of time that individual processors must spend waiting for each other.

This object is achieved by a synchronization apparatus which synchronizes parallel processors so that at least one of the processors executes at least one non-idling instruction while awaiting synchronization with at least one other processor.

This object is further achieved by identifying certain regions of code in the respective instruction streams. The regions are referred to herein as "shaded" and "unshaded".

The shaded regions are defined herein as "fuzzy" barriers. A processor begins to attempt synchronization upon reaching a respective shaded region. Synchronization is achieved when no processor executes an instruction following its respective shaded region until all processors performing related tasks have finished all instructions in the unshaded region preceding their respective corresponding shaded region.

The object is still further achieved by an apparatus which coordinates synchronization information between parallel processors and which uses a state machine to keep track of synchronization information.

Further objects and advantages will be apparent from the remainder of the specification and from the claims.

DETAILED DESCRIPTION OF THE PREFERRED EMBODIMENTS

Figure 1A:
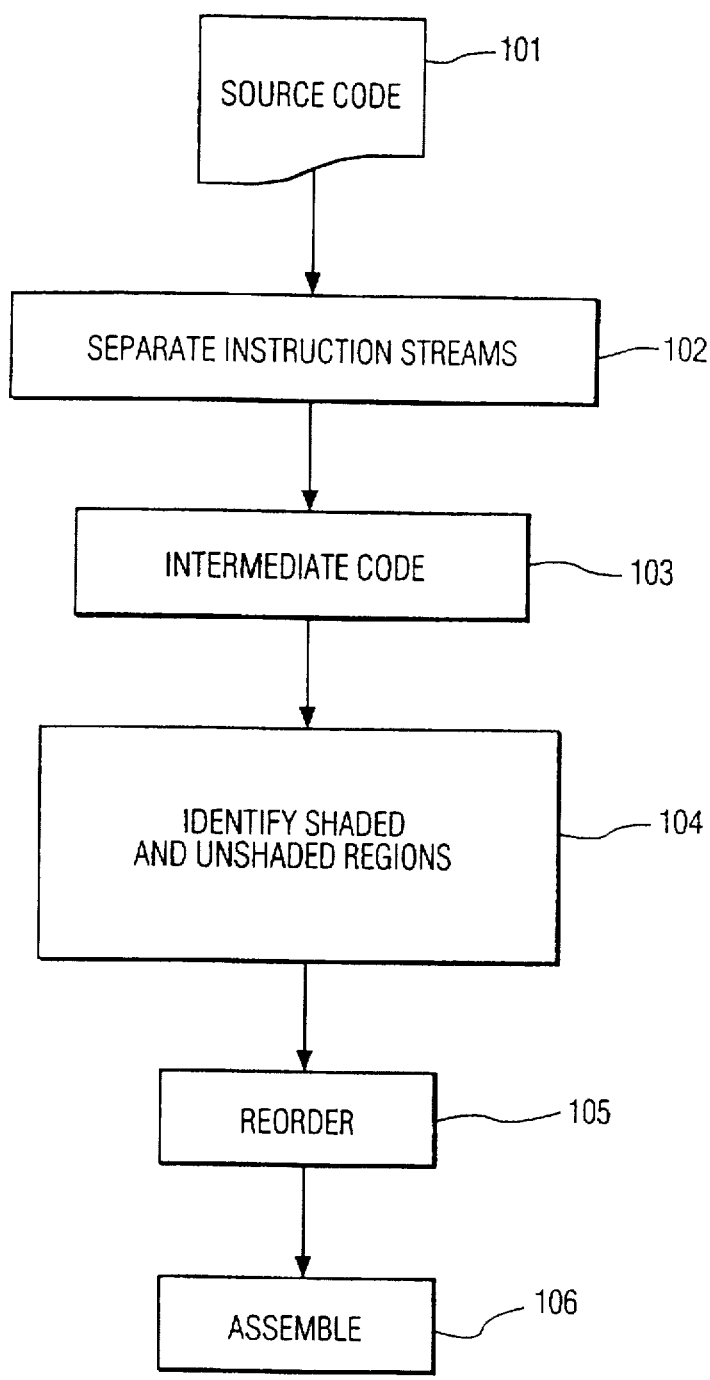
FIG. 1a is a flow chart which describes a method for compiling source code to identify shaded and unshaded regions.

FIG. 1a is a flow chart showing compilation of source code to create shaded regions.

In box 101, the compilation starts with source code. An example of some C source code, suitable for parallel processing follows:

```
int a[10][4];
...
for (j=2; j<10; j++)
    for (i=2, i<5; i++)
        a[j][i] = a[j-1)][i+1] +i*j,
...
```

In box 102, the compilation identifies parts of the code which can be executed on separate processors. Box 102 uses the method as described in the above-mentioned book by H. Stone, and article by M. Wolfe et al. In the source code example, the inner loop can be executed in parallel on separate processors. The code for the inner loop would then look as follows:

| P1(i=2) | P2(i=3) | P3(i=4) |
|---|---|---|
| ... | ... | ... |
| (for (j=2, j<10; j++) | for (j=2, j<10, j++) | (for (j=2, j<10, j++) |
| { | { | { |
| a[j][2]=a[j-1][3]+2*j; | a[j][3]=a[j-1][4]+3*j; | a[j][4]=a[j-1][5]+4*j; |
| barrier; | barrier; | barrier |
| } | } | } |

The barriers were inserted because of loop carried dependences. In other words, in the example, the value of a[2][3] computed by processor P2 in the first iteration of the loop is needed by processor P1 in the second iteration. In the prior art, each of the three processors would have to wait in each loop until each of the other processors reached the point marked barrier.

In box 103, the compilation generates intermediate code, using standard techniques. In what follows, the intermediate code will be expressed in a standard notation called "three address code". This code and techniques for generating it are described A. Aho et al, *Principles of Compiler Design*, (Addison Wesley 1979) Ch. 7.

In the example, the intermediate code for the three processors will be the same except for the value of "i" which is initialized to 2, 3, and 4 for processors P1, P2, and P3, respectively.

Box 104 identifies shaded and unshaded regions. The shaded regions will consitute fuzzy barriers. In other words, as in the case of the traditional barrier, when a processor reaches a shaded region it will want to synchronize. However, in contrast with the prior art, in the case of the fuzzy barrier, or shaded region, the processor will be able to continue executing instructions while waiting to synchronize. The unshaded regions will constitute areas where the processors do not seek to synchronize.

After box 104, the intermediate code will be:

| Comment: Let A be the base address of the array a | | |
|---|---|---|
| | j = 2 | |
| L1: | T1 = j − 1 | |
| | T2 = 16 * T1 | |
| | T3 = T2 + A | |
| | T4 = (i+1) * 4 | |
| | T5 = i * j | |
| Comment: unshaded region | | |
| I1: | T6 = T4[T3] + T5 | /*T6=a[j−1][i+1]+i*j  */ |
| | T7 = 16 * j | |
| | T8 = T7 + A | |
| | T9 = i * 4 | |
| I2: | T9[T8] = T6 | /* a[j][i] = T6  */ |
| | j = j + 1 | |
| | if j<10 to to L1 | |

Box 104 finds these shaded and unshaded region as follows.

The default is for instructions to be in a shaded region. This default is set because the processor can never stall while executing instructions in the shaded region. Shaded regions are therefore preferred.

Finding the unshaded part includes two main steps. First, the first and last instructions with lexically forward dependences and/or loop carried dependences are identified as unshaded. Then all of the instructions between those first and last instructions are also unshaded. In the example, I1 and I2 are the only instructions with loop carried dependences. During the execution of instruction I1, the processor accesses a value that was computed by some other processor in a previous iteration. During execution of instruction I2, a value that will be used by some other processor in a subsequent iteration is stored in the array. Therefore I1, I2, and all of the instructions between them are unshaded.

In executing the code, the parallel processors will be "synchronized" if no processor executes an instruction in the unshaded region following a shaded region, until all other processors have finished all instructions in the unshaded region preceding the corresponding shaded region. This requirement means that those instructions which result in lexically forward and loop carried dependences cannot be executed until the dependences are resolved.

In box 105, the intermediate code is reordered to achieve greater efficiency. Standard reordering techniques can be used for this purpose. Greater efficiency is achieved as the unshaded regions become smaller, because a processor can never be stalled while it is executing instructions in a shaded region. Therefore the reordering techniques are applied to reduce the number of instructions in the unshaded regions. Therefore, after the reordering, the intermediate code is converted to the following:

| Comment: Let A be the base address of the array a | | |
|---|---|---|
| | j = 2 | |
| L1: | T1 = j − 1 | |
| | T2 = 4 * T1 | |
| | T3 = T2 + A | |
| | T4 = (i+1) * 4 | |
| | T5 = i * j | |
| | T7 = 4 * j | |
| | T8 = T7 + A | |
| | T9 = i * 4 | |
| Comment: unshaded region | | |
| I1: | T6 = T4[T3] + T5 | /*T6=a[j−1][i+1]+i*j  */ |
| I2: | T9[T8] = T6 | /* a[j][i] = T6  */ |
| | j = j + 1 | |
| | if j<10 to to L1 | |

In this reordering, the three instructions between I1 and I2 were moved out of the unshaded region. In this example, the three instructions were moved above I1. In some cases, the same effect may be achieved by moving instructions past the last instruction with a lexically forward or loop carried dependence. In other words, the instructions can be moved out of the unshaded region by moving them upward (above I1) or downward (below I2)

In reading the above intermediate code, the reader should note that the code is part of a loop. Thus, the shaded region after the unshaded region joins the shaded region before the unshaded region, in a subsequent iteration. For example, at the end of the first iteration of the loop the first processor can return to the beginning of the loop and keep executing code. If all of the other processors have finished their respective instructions I2 in their first iterations, the first processor can begin its instruction I1 on its second iteration. Since most instructions are in the shaded region, the processors have to spend very little or no time waiting for each other.

In box 106, the intermediate code is assembled. For the above example, the VAX assembly code for each processor is given below. Assembly is a standard process performed by standard compilers. During assembly, instructions can be marked as part of the shaded region by turning on a bit reserved for that purpose in the instruction. This bit will be called the "I-bit" in what follows.

| | P1(i=2) | | P2(i=3) | | P3(i=4) | |
|---|---|---|---|---|---|---|
| | movab | −172(sp),sp | movab | −172(sp),sp | movab | −172(sp),sp |
| | movl | $2,−4(fp) | movl | $2,−8(fp) | movl | $2,−12(fp) |
| L21: | moval | −172(fp),r0 | L21: moval | −172(fp),r0 | L21: moval | −172(fp),r0 |

-continued

| P1(i=2) | | P2(i=3) | | P3(i=4) | |
|---|---|---|---|---|---|
| subl3 | $1,-4(fp),r1 | subl3 | $1,-8(fp),r1 | subl3 | $1,-12(fp),r1 |
| ashl | $4,r1,r1 | ashl | $4,r1,r1 | ashl | $4,r1,r1 |
| addl2 | r1,r0 | addl2 | r1,r0 | addl2 | r1,r0 |
| ashl | $1,-4(fp),r1 | mull3 | $3,-8(fp),r1 | ashl | $2,-12(fp),r1 |
| addl3 | r1,12(r0),r0 | addl3 | r1,16(r0),r0 | addl3 | r1,20(r0),r0 |
| moval | -172(fp),r1 | moval | -172(fp),r1 | moval | -172(fp),r1 |
| ashl | $4,-4(fp),r2 | ashl | $4,-8(fp),r2 | ashl | $4,-12(fp),r2 |
| addl2 | r2,r1 | addl2 | r2,r1 | addl2 | r2,r1 |
| movl | r0,8(r1) | movl | r0,12(r1) | movl | r0,16(r1) |
| incl | -4(fp) | incl | -8(fp) | incl | -12(fp) |
| cmpl | -4(fp),$10 | cmpl | -8(fp),$10 | cmpl | -12(fp),$10 |
| jlss | L21 | jlss | L21 | jlss | L21 |

Figure 1B:
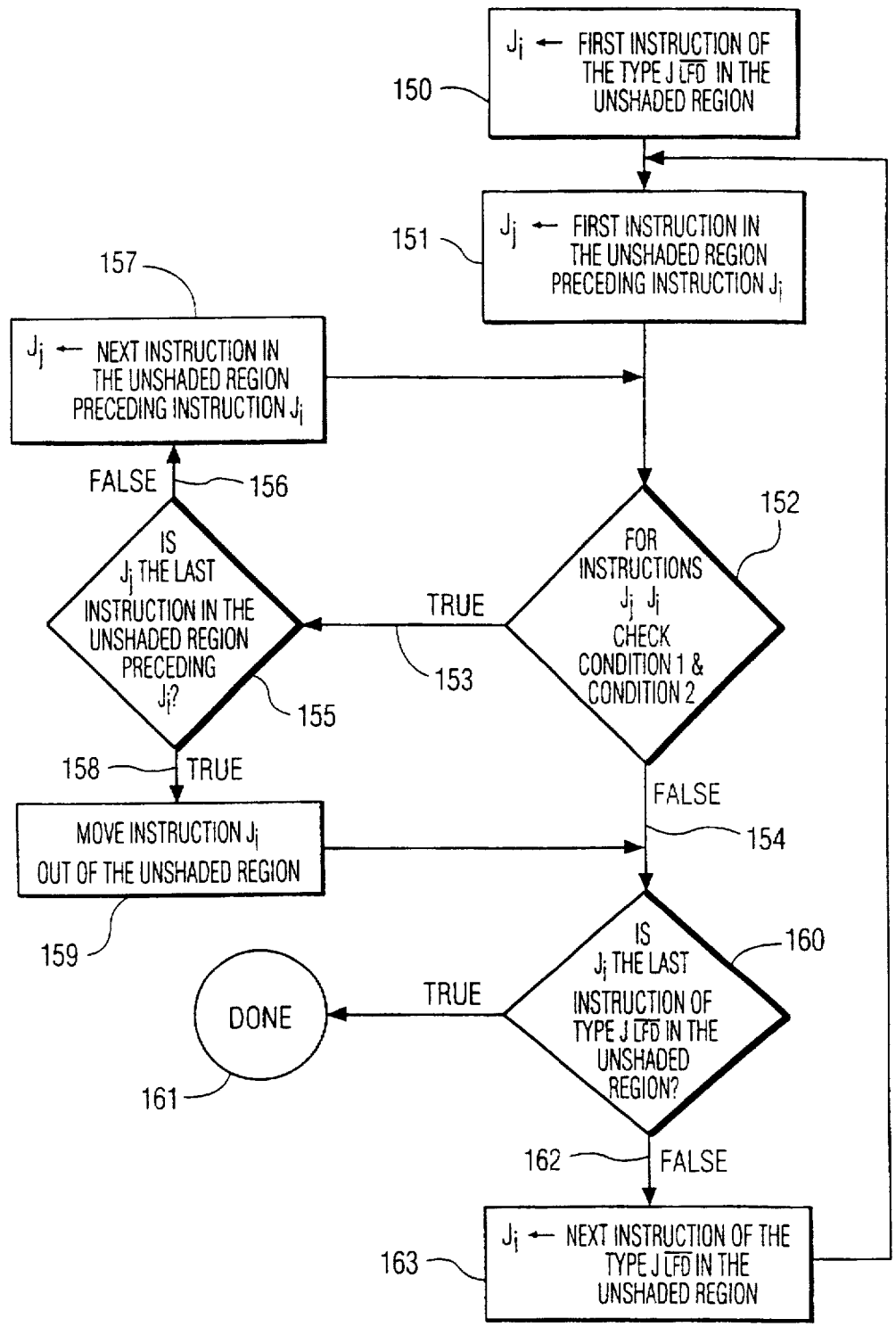
FIG. 1b is a flow chart describing steps for reordering code.

One reordering technique, which can be used in box 105 is described in the flowchart of FIG. 1b. FIG. 1b uses the notation $J_{LFD}$ to refer to instructions not involved in lexically forward or loop carried dependences and $J_{LFD}$ to refer to instructions involved in lexically forward or loop carried dependences. All instructions of the type $J_{LFD}$ are candidates for moving out of the unshaded region. In general, given two instructions, $J_i$ and $J_{i+1}$, in that order, then $J_{i+1}$ can be moved above $J_i$, if the following conditions are true:

Condition 1: $J_i$ does not read from a memory location that $J_{i+1}$ writes to; and Condition 2: $J_i$ does not write to a memory location that $J_{i+1}$ reads from.

FIG. 1a also assumes an unshaded region having a sequence of instructions $J_1, J_2, J_3, \ldots, J_N$.

Box 150 assigns to $J_i$ the first instruction of the type J LFD. Box 151 assigns to $J_j$ the first instruction in the unshaded region preceding $J_i$. Box 152 loops through instructions $J_j$ through $J_i$, testing Condition 1 and Condition 2, for each instruction. If both Condition 1 and Condition 2 are true, for a given instruction, the method takes branch 153. If either or both of Condition 1 and Condition 2 are false, then the method takes branch 154.

Branch 153 leads to box 155, which tests whether $J_j$ is the last instruction in the unshaded region preceding $J_i$. If the result of the test of box 155 is false, the method takes branch 156 to box 157, where $J_j$ is assigned the next instruction in the unshaded region preceding instruction $J_i$. After box 157 the method returns to box 152.

If the result of the test of box 155 is true, the method takes branch 158 to box 159. In box 159, instruction $J_i$ is moved out of the unshaded region. The procedure described shows how instructions may be moved up. After box 159, the method moves to branch 154.

If the result of the tests of box 152 are both false, the method takes branch 154 to box 160. In box 160, the method tests whether $I_i$ is the last instruction of the type $J_{LFD}$ in the unshaded region. If the result of the test of box 160 is true, the method of FIG. 1b is finished 161. If the result of the test of box 160 is false, then the method takes branch 162 to box 163.

Box 163 assigns to $J_i$ the next instruction of the type J LFD. After box 163, the method of FIG. 1b returns to box 151.

By performing the above steps on the example, it is determined that the only two instructions which must be in the unshaded regions are those which are marked I1 and I2.

A procedure similar to that shown in FIG. 1b can be applied to move the remaining instructions, which do not result in lexically forward or loop carried dependences, down and out of the unshaded region. The similar procedure would differ from that described in FIG. 1b only in that, instead of comparing an instruction with all preceding instructions in the unshaded region, the compiler should compare it with all succeeding instructions.

Figure 2:
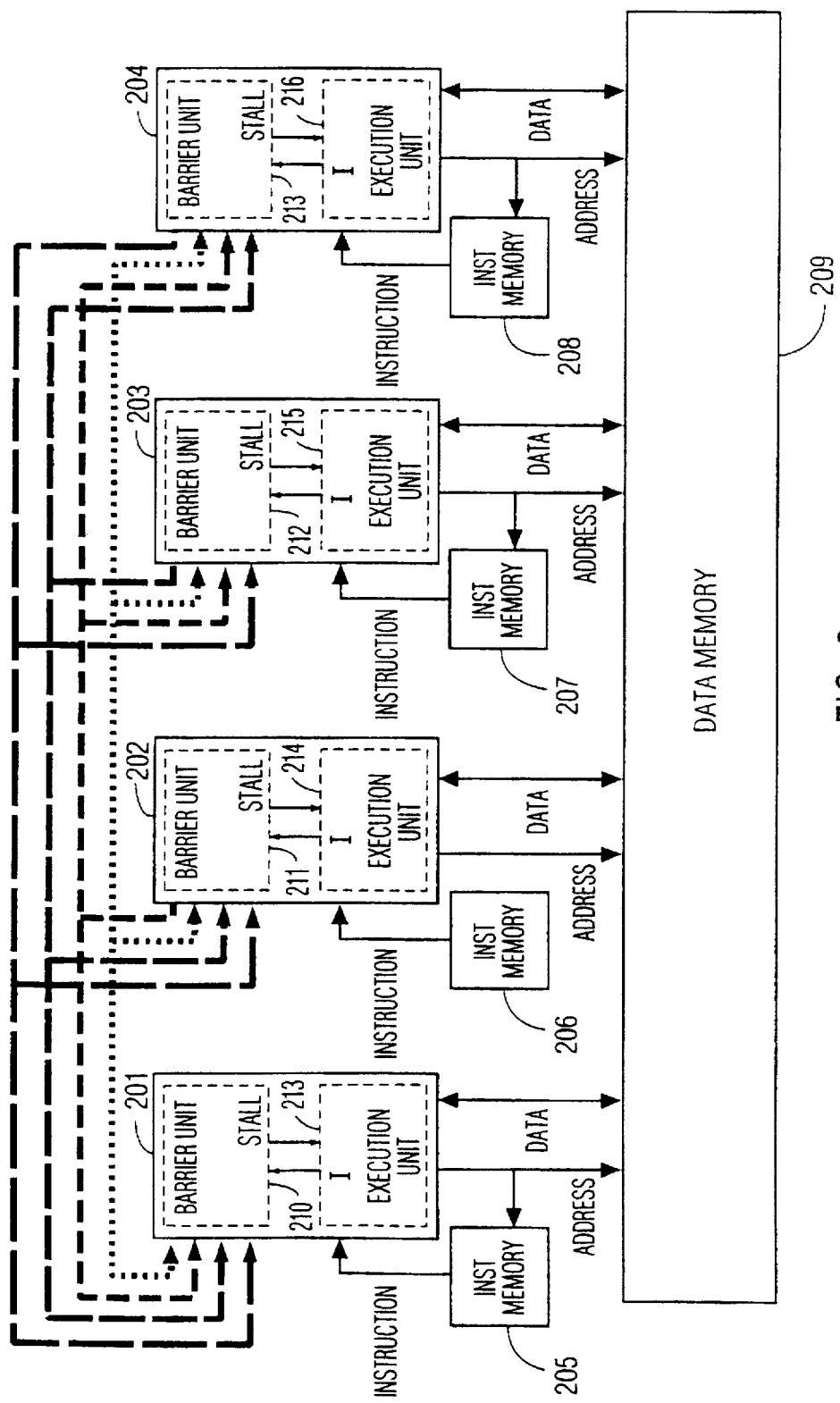
FIG. 2 is a system diagram showing a parallel processing system.

FIG. 2 is a block diagram of a parallel processing system including four parallel processors 201, 202, 203, and 204, with respective instruction memories 205, 206, 207, and 208. There may be an arbitrary number, n, of processors, where n is an integer greater than 2. Four processors are chosen here for ease of illustration. The parallel processors 201, 202, 203, and 204 share a data memory 209. Each processor has a respective barrier unit 210, 211, 212, and 213. Each barrier unit 210, 211, 212, and 213 has four inputs and two outputs. The three inputs from the other processors indicate whether a respective other processor wants to synchronize. These inputs will be referred to herein as WANT_IN. The output which goes to the other processors indicates that the respective processor wants to synchronize. These outputs will be referred to herein as WANT_OUT. Each barrier unit 210, 211, 212, and 213 also has a respective I input from and a respective STALL output to its respective execution unit 213, 214, 215, and 216.

Figure 3:
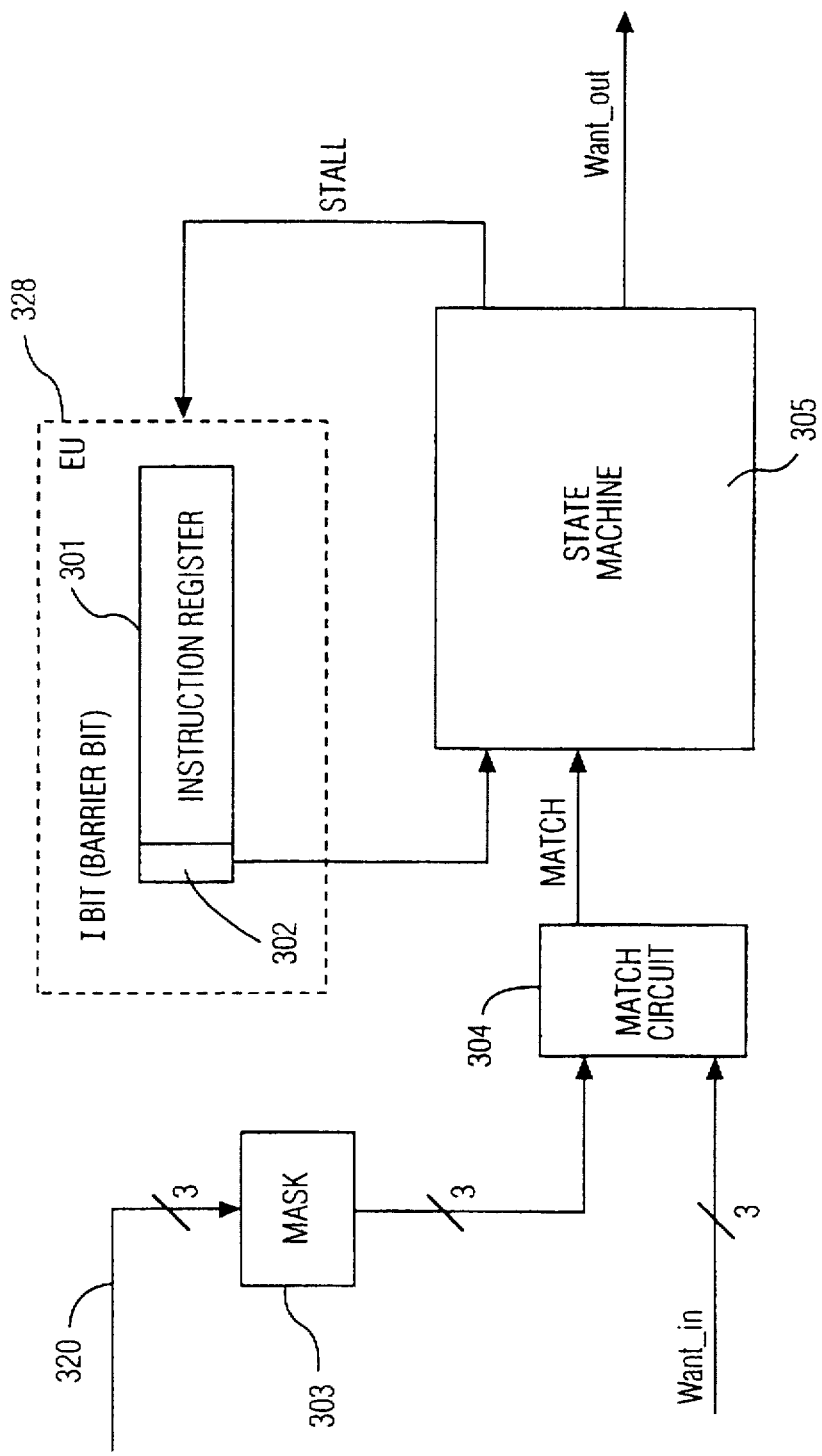
FIG. 3 is a block diagram of circuit for synchronizing parallel processors.

FIG. 3 shows more detail in one of the parallel processors 201, 202, 203, and 204, including one of the barrier units 210, 211, 212, and 213. The barrier unit is for receiving, processing, and sending synchronization information. The instruction register 301 is shown within an execution unit 328 and is large enough to contain the longest instruction in the relevant instruction set, plus the I-bit 302. In other words, the processor is assumed to be a RISC processor, which executes one instruction per machine cycle. The I-bit is turned on when the instruction in the instruction register 301 is in a shaded region. The I-bit is off when the instruction is in an unshaded region.

Alternatively, the instruction register 301 can be smaller and instructions can take up several words, if logic, not shown, is included for locking out the I-bit 302 except in the first word of the instruction. Another alternative approach would be to dedicate an entire instruction in each instruction stream for marking the beginnings of the shaded and unshaded regions. Such an approach would require some minor changes to the state machine. This approach would add instructions to the respective instruction streams, but would require fewer changes to existing hardware and machine instruction sets than the I-bit approach.

The mask register 303, is an internally addressed special register, and has n−1 bits, where n is the number of processors in the system. In the present example, it is assumed that n=4. Each of the processors contains the apparatus of FIG. 3. Mask register 303 therefore must have 3 bits, to keep track of the other processors in the system. The mask register 303 is used to ignore other processors which are not performing related tasks. A bit of the mask register 303 is turned off when the corresponding other processor is performing a related task. A bit of the mask register 303 is turned on when the corresponding other processor is not performing a related task. Mask register 303 receives its mask bits from a 3-bit input 320. In the example, only three processors are needed to execute the code. Therefore two bits of the mask register 303 will be off at each processor that is running one of the loops. The third bit will be on, so that the processors running the loops ignore the one processor that is not running the loops. The compiler knows which processors are synchronizing at the barrier and thus can generate an instruction which causes appropriate bits to be written to the mask register 303.

The processors which are ignored, as a result of the bits of the mask register 303 being on in one processor, can in turn perform independent tasks, ignoring the one processor by setting their own mask registers. Such independent tasks can include independent synchronization on an independent job requiring parallel processing.

WANT_IN is an n-1 bit input for receiving "WANT" bits from the other processors. The WANT bits will be on when the corresponding processors want to synchronize.

Match circuit 304 contains logic for coordinating the bits in the mask register 303 and the WANT bits on input WANT_IN. The output of match circuit 304 is called "MATCH" and is on only when all of the relevant other processors want to synchronize.

State machine 305 uses the I-bit and the output MATCH of the match circuit 304 to determine synchronization states. State machine 305 outputs two bits: STALL and WANT_OUT. STALL is off when the processor is executing instructions. STALL is turned on to stop the processor from executing instructions. WANT_OUT is turned on when the respective processor wants to synchronize, and is otherwise off.

Figure 4:
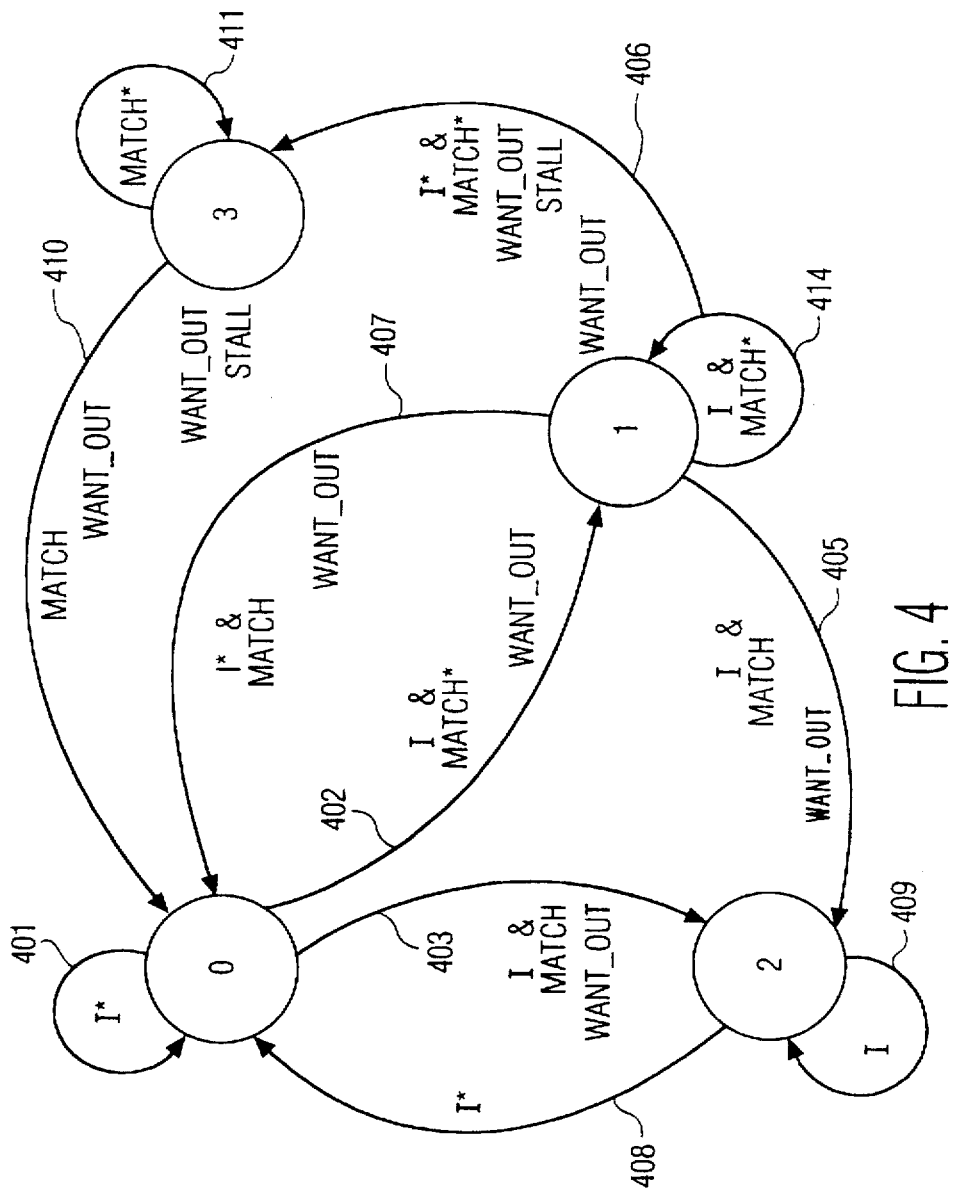
FIG. 4 is a state diagram.

FIG. 4 is a state diagram for the state machine 305. In this embodiment, the state machine 305 is a Mealy machine. In other words the outputs STALL and WANT_OUT can change without the machine changing states. In FIG. 4, inputs to the state machine 305 are indicated in a smaller font and outputs from the state machine 305 are indicated in bold-face italic font.

Each of the processors 201, 202, 203, and 204 includes one of the state machines as described in FIG. 4. In order for these state machines to work, there must be a common clock or alternate means of synchronizing signals between the state machines. For simplicity, the circuitry for synchronizing the state machines 305 is not illustrated in the figures. Transition 401 corresponds to remaining in state 0. The machine stays in state 0, while the I-bit is off. In other words, the processor is executing an unshaded region of code and is not going to a shaded region of code. STALL and WANT_OUT are both off.

Transition 402 takes the machine from state 0 to state 1. The machine makes transition 402 when its respective processor is ready to synchronize, but at least one of the other relevant processors is not ready to synchronize, i.e. when the I-bit is on and MATCH is off. The conditions I=0 and MATCH=0 are denoted I* and MATCH*, respectively, in FIG. 4. During transition 402, WANT_OUT is on and STALL is off. In FIG. 4, when STALL or WANT_OUT is off, it is simply omitted. Transition 404 keeps the machine in state 1. The machine makes transition 404 so long as it wants to synchronize and has not yet done so, but is still executing instructions. In other words the machine stays in state 1 while the I-bit is on and MATCH is off. During state 1, WANT_OUT is on and STALL is off.

Transition 403 takes the machine from state 0 to state 2. The machine makes transition 403 when its respective processor is ready to synchronize, and it is the last of the relevant processors to get to that point. Several processors can reach state 2 simultaneously and are thus several simultaneous "last" processors. State 2 is a state in which the processor is synchronized. When the state machine 305 is making the transition 403, it keeps WANT_OUT on. However, it turns WANT_OUT off when it reaches state 2. STALL stays off during transition 403 and state 2.

Transition 405 takes the machine from state 1 to state 2. The machine makes transition 405 when the respective processor is still in its shaded region, wanting to synchronize, and all of the other processors have reached their respective shaded regions, i.e. when both the I-bit and MATCH are on. When the machine makes transition 405, it keeps the WANT_OUT bit on. STALL is off during transition 405. The WANT_OUT bit returns to off, when the machine reaches state 2.

Transition 406 takes the machine from state 1 to state 3. The machine makes transition 406 when it is ready to leave its shaded region, but has not been able to make it to state 2. In other words, the I-bit turns off and MATCH is off. At this point, the respective processor must stall. Therefore both WANT_OUT and STALL are turned on.

Transition 407 takes the machine from state 1 to state 0. The machine makes this transition, when MATCH turns on and the relevant processor leaves the shaded region simultaneously. The machine keeps WANT_OUT on during transition 407, and turns it off again when it reaches state 0. STALL remains off during transition 407.

Transition 408 takes the state machine 305 from state 2 to state 0. Transition 408 occurs after synchronization, when the I-bit turns off, i.e. when the respective processor leaves a shaded region. During transition 408, WANT_OUT and STALL are both off.

Transition 409 keeps the machine in state 2. Transition 409 occurs after synchronization so long as the I-bit remains 1, i.e. so long as the respective parallel processor remains in the shaded region after synchronization. During transition 409, WANT_OUT and STALL are both off.

Transition 411 keeps the machine in state 3, i.e. stalled and waiting to synchronize. The machine makes transition 411 so long as MATCH is off. While in state 3 the machine continues to keep both WANT_OUT and STALL on.

Transition 410 takes the machine from state 3 to state 0. The machine makes transition 410 when it has succeeded in synchronizing with the other machines and can leave its shaded region, in other words when MATCH turns on. During transition 410, WANT_OUT stays on. WANT_OUT turns off, once the machine reaches state 0. During transition 410, STALL is off.

Figure 5:
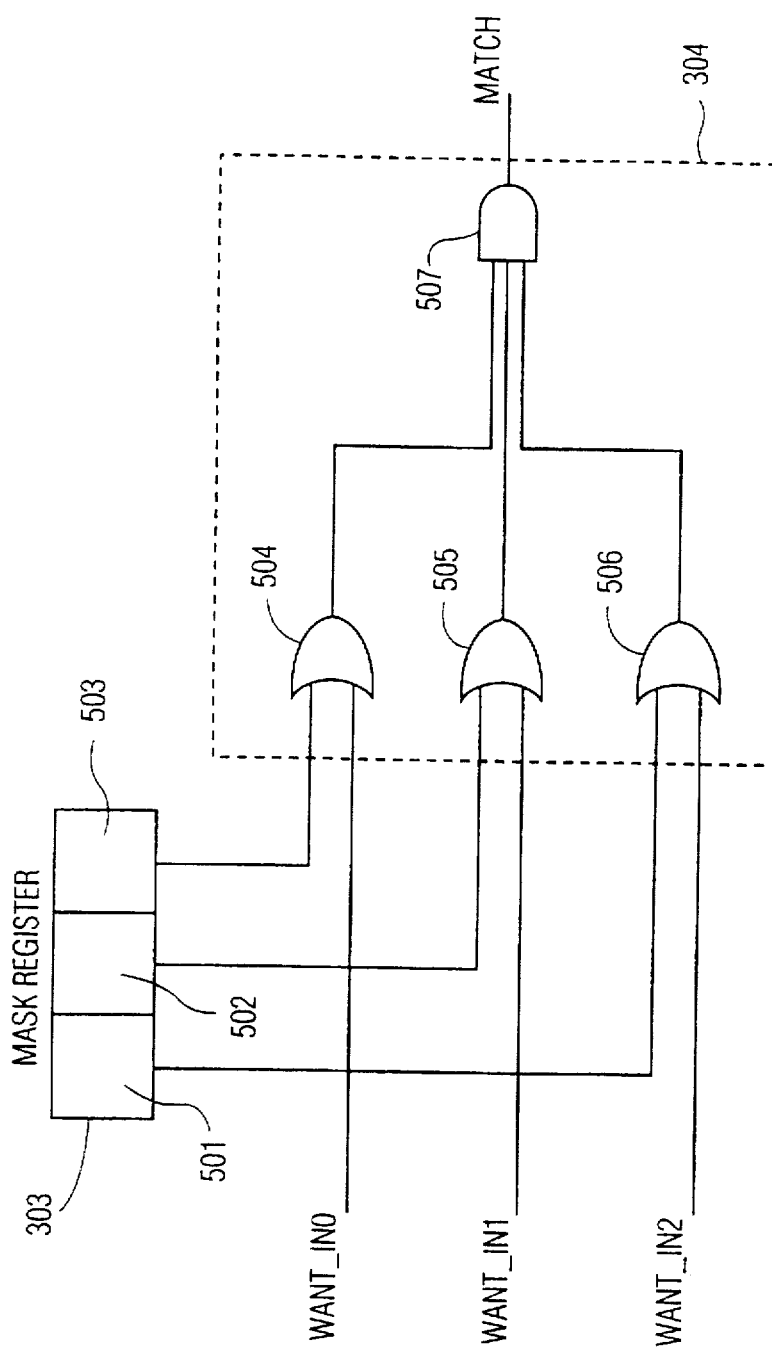
FIG. 5 is a detailed diagram of the contents of box 304.

FIG. 5 shows the details of box 304. The three bits 501, 502, and 503 of mask register 303 are also shown in FIG. 5. The mask register 303 has three bits because there are three other parallel processors in the system. The three bits of WANT_IN are shown as three separate lines WANT_IN0, WANT_IN1, and WANT_IN2. Mask register bit 503 and WANT_IN0 are fed to OR gate 504. Mask register bit 502 and WANT_IN1 are fed to OR gate 505. Mask register bit 501 and WANT_IN2 are fed to OR gate 506. The outputs of OR gates 504, 505, and 506 are fed to AND gate 507. The output of gate 507 is MATCH.

The output MATCH is thus on when all of the other processors, which are not being ignored, want to synchronize. MATCH is thus also on when all of the other processors are being ignored.

We claim:

1. A parallel processor system comprising:

first and second data processors for executing first and second sequences of instructions, respectively, in parallel, wherein:

the first sequence comprises a concatenation of a first unshaded region of consecutive instructions followed by a second shaded region of consecutive instructions followed by a third unshaded region of consecutive instructions;

the second sequence comprises a concatenation of a fourth unshaded region of consecutive instructions followed by a fifth shaded region of consecutive instructions followed by a sixth unshaded region of consecutive instructions;

each instruction in the second shaded region is executable independently of any instruction in the fourth and any successive regions in the second instruction stream;

each instruction in the fifth shaded region is executable independently of any instruction in the first and any successive regions in the first instruction stream;

at least one instruction in the first unshaded region and at least one instruction in the sixth unshaded region have a dependence relationship, or at least one instruction in the third unshaded region and at least one instruction in the fourth unshaded region have a dependence relationship;

synchronization means coupled to the processors for controlling synchronization between the processors during execution of said first and second streams of instructions in parallel, so that the first processor exits the second shaded region only after the second processor has completed execution of the instructions in the fourth unshaded region, or so that the second processor exits the fifth shaded region only after the first processor has completed execution of the instructions in the first unshaded region.

2. The system of claim 1, wherein:

the synchronization means detects whether a specific first one of the instructions to be executed next by the first processor belongs to the first unshaded region or the third unshaded region;

the synchronization means detects whether a specific second one of the instructions to be executed next by the second processor belongs to the fourth unshaded region or the sixth unshaded region;

a necessary first condition for the synchronization means to stall the first processor involves that the specific first instruction belongs to the third unshaded region and the specific second instruction belongs to the fourth unshaded region;

a necessary second condition for the synchronization means to stall the second processor involves that the specific second instruction belongs to the sixth unshaded region and the specific first instruction belongs to the first unshaded region.

3. The system of claim 2, wherein the synchronization means detects the associated ones of the regions for the first and second specific instructions under control of the first and second sequences of instructions comprising a plurality of respective marking instructions that mark beginnings of respective ones of the shaded and unshaded regions.

4. The system of claim 3, wherein:

the synchronization means is operative to create first and second marking bits for the first and second specific instructions, respectively, under control of the marking instructions;

each respective one of the first and second marking bits has a first value if the associated region is a shaded one of said regions, and a second value if the associated region is an unshaded one of said regions;

the synchronization means comprises:

a first barrier unit for control of the first processor and having a first input, a second input, a first output and a second output;

a second barrier unit for control of the second processor and having a third input, a fourth input, a third output and a fourth output;

wherein:

the first input is coupled to the third output;

the second input receives the first marking bit;

the third input is coupled to the first output;

the fourth input receives the second marking bit;

the first output supplies a first WANT_OUT signal;

the second output is connected to a stall input of the first processor and supplies a first STALL signal to control stalling of the first processor;

the third output supplies a second WANT_OUT signal;

the fourth output is connected to a stall input of the second processor and supplies a second STALL signal to control stalling of the second processor;

the first WANT_OUT signal and the first STALL signal are logic functions of the first marking bit and the second WANT-OUT signal; and the second WANT_OUT signal and the second STALL signal are logic functions of the second marking bit and the first WANT_OUT signal.

5. The system of claim 4, wherein each respective one of the first and second barrier units comprises a respective Mealy state machine.

6. The system of claim 2, wherein:

the synchronization means detects the associated ones of the regions for the first and second specific instructions under control of first and second marking bit included in the first and second specific instructions, respectively; and each respective one of the first and second marking bits has a first value if the associated region is a shaded one of said regions, and a second value if the associated region is an unshaded one of said regions.

7. The system of claim 6, wherein the synchronization means comprises:

a first barrier unit for control of the first processor and having a first input, a second input, a first output and a second output;

a second barrier unit for control of the second processor and having a third input, a fourth input, a third output and a fourth output;

wherein:

the first input is coupled to the third output;

the second input receives the first marking bit;

the third input is coupled to the first output;

the fourth input receives the second marking bit;

the first output supplies a first WANT_OUT signal;

the second output is connected to a stall input of the first processor and supplies a first STALL signal to control stalling of the first processor;

the third output supplies a second WANT_OUT signal;

the fourth output is connected to a stall input of the second processor and supplies a second STALL signal to control stalling of the second processor;

the first WANT_OUT signal and the first STALL signal are logic functions of the first marking bit and the second WANT-OUT signal; and the second WANT_OUT signal and the second STALL signal are logic functions of the second marking bit and the first WANT_OUT signal.

8. The system of claim 7, wherein each respective one of the first and second barrier units comprises a respective Mealy state machine.

9. The system of claim 2, wherein:

the synchronization means has mask register means to selectively overrule at least the first condition.

10. The system of claim 4, wherein:

the synchronization means has mask register means to selectively overrule at least the first condition; and the mask register means comprises:

a programmable register for storing a programmable bit;

a logic gate with:

a first gate input for receiving the second WANT_OUT signal;

a second gate input for receiving the programmable bit;

a gate output connected to the second input for providing a logic combination of the second WANT_OUT signal and the programmable bit.

11. The system of claim 7, wherein:

the synchronization means has mask register means to selectively overrule at least the first condition;

the mask register means comprises:

a programmable register for storing a programmable bit;

a logic gate with:

a first gate input for receiving the second WANT_OUT signal;

a second gate input for receiving the programmable bit;

a gate output connected to the second input for providing a logic combination of the second WANT_OUT signal and the programmable bit.

* * * * *